United States Patent
Laput et al.

(10) Patent No.: US 10,657,385 B2
(45) Date of Patent: May 19, 2020

(54) SYSTEM AND METHOD FOR ADAPTIVE, RAPIDLY DEPLOYABLE, HUMAN-INTELLIGENT SENSOR FEEDS

(71) Applicants: CARNEGIE MELLON UNIVERSITY, a Pennsylvania Non-Profit Corporation, Pittsburgh, PA (US); University of Rochester, New York, NY (US)

(72) Inventors: Gierad Laput, Pittsburgh, PA (US); Christopher Harrison, Pittsburgh, PA (US); Jeffrey P. Bigham, Pittsburgh, PA (US); Walter S. Lasecki, Ann Arbor, MI (US); Bo Robert Xiao, Pittsburgh, PA (US); Jason Wiese, San Francisco, CA (US)

(73) Assignees: CARNEGIE MELLON UNIVERSITY, a Pennsylvania Non-Pro fit Corporation, Pittsburgh, PA (US); UNIVERSITY OF ROCHESTER, Rochester, NY (US)

( * ) Notice: Subject to any disclaimer, the term of this patent is extended or adjusted under 35 U.S.C. 154(b) by 0 days.

(21) Appl. No.: 15/561,407

(22) PCT Filed: Mar. 25, 2016

(86) PCT No.: PCT/US2016/024359
§ 371 (c)(1),
(2) Date: Sep. 25, 2017

(87) PCT Pub. No.: WO2016/154598
PCT Pub. Date: Sep. 29, 2016

(65) Prior Publication Data
US 2018/0107879 A1 Apr. 19, 2018

Related U.S. Application Data

(60) Provisional application No. 62/177,825, filed on Mar. 25, 2015.

(51) Int. Cl.
*G06K 9/00* (2006.01)
*G06N 20/00* (2019.01)
(Continued)

(52) U.S. Cl.
CPC .......... *G06K 9/00771* (2013.01); *G06F 3/01* (2013.01); *G06F 17/18* (2013.01);
(Continued)

(58) Field of Classification Search
CPC . G06F 3/01; G06F 15/18; G06F 17/18; G06F 17/28; G06K 9/00993; G06K 9/036;
(Continued)

(56) References Cited

U.S. PATENT DOCUMENTS 4,046,071 A 9/1977 Mizuno et al.
7,961,906 B2 6/2011 Ruedin
(Continued)

FOREIGN PATENT DOCUMENTS

EP 2347809 A1 7/2011

OTHER PUBLICATIONS

International Search Report and Written Opinion of the International Searching Authority for PCT Application PCT/US2016/024359 dated Jun. 21, 2016.
(Continued)

*Primary Examiner* — Shefali D Goradia
(74) *Attorney, Agent, or Firm* — Michael G. Monyok

(57) ABSTRACT

The disclosure describes a sensor system that provides end users with intelligent sensing capabilities, and embodies both crowd sourcing and machine learning together. Further, a sporadic crowd assessment is used to ensure continued sensor accuracy when the system is relying on machine learning analysis. This sensor approach requires minimal and non-permanent sensor installation by utilizing any
(Continued)

device with a camera as a sensor host, and provides human-centered and actionable sensor output.

19 Claims, 10 Drawing Sheets

(51) Int. Cl.
  G06K 9/03 (2006.01)
  G06K 9/62 (2006.01)
  G06N 5/04 (2006.01)
  G06N 20/10 (2019.01)
  G06Q 50/00 (2012.01)
  G06F 3/01 (2006.01)
  G06F 17/18 (2006.01)
  G06F 40/40 (2020.01)

(52) U.S. Cl.
  CPC ......... *G06K 9/00993* (2013.01); *G06K 9/036* (2013.01); *G06K 9/6259* (2013.01); *G06K 9/6262* (2013.01); *G06N 5/041* (2013.01); *G06N 20/00* (2019.01); *G06N 20/10* (2019.01); *G06Q 50/01* (2013.01); *G06F 40/40* (2020.01); *G06K 9/6212* (2013.01)

(58) Field of Classification Search
  CPC .. G06K 9/6259; G06K 9/6262; G06K 9/6212; G06K 9/00771
  See application file for complete search history.

(56) References Cited

U.S. PATENT DOCUMENTS

| | | | |
|---|---|---|---|
| 8,204,316 B2 | 6/2012 | Tehrani et al. | |
| 8,756,173 B2 | 6/2014 | Hunzinger et al. | |
| 8,971,612 B2 | 3/2015 | Shotton et al. | |
| 9,158,532 B2* | 10/2015 | Schaefer | G06F 8/70 |
| 2005/0022160 A1* | 1/2005 | Uluakar | G06F 8/20 |
| | | | 717/105 |
| 2012/0197852 A1 | 8/2012 | Dutta et al. | |
| 2012/0323700 A1* | 12/2012 | Aleksandrovich | G06F 21/36 |
| | | | 705/14.69 |
| 2013/0077820 A1 | 3/2013 | Marais et al. | |
| 2013/0150117 A1 | 6/2013 | Rodriguez et al. | |
| 2013/0218816 A1 | 8/2013 | Yu et al. | |
| 2014/0101083 A1 | 4/2014 | Nicholson et al. | |
| 2017/0249445 A1* | 8/2017 | Devries | G16H 10/60 |

OTHER PUBLICATIONS

Abowd, G. D. et al. "Designing for the human experience in smart environments." Smart environments: technologies, protocols, and applications (2005): 151-174.
Bernstein, M.S. et al. "Crowds in two seconds: Enabling realtime crowd-powered interfaces." In Proceedings of the 24th annual ACM symposium on User interface software and technology, pp. 33-42. ACM, 2011.
Bigham, J. P. et al. "VizWiz: nearly real-time answers to visual questions." In Proceedings of the 23nd annual ACM symposium on User interface software and technology, pp. 333-342. ACM, 2010.
Boyle, M. et al. "The language of privacy: Learning from video media space analysis and design." ACM Transactions on Computer-Human Interaction (TOCHI) 12, No. 2 (2005): 328-370.
Boyle, M. et al. "The effects of filtered video on awareness and privacy." In Proceedings of the 2000 ACM conference on Computer supported cooperative work, pp. 1-10. ACM, 2000.
Cohen, Jacob. "A coefficient of agreement for nominal scales." Educational and psychological measurement 20, No. 1 (1960): 37-46.

Deng, J. et al. "Fine-grained crowdsourcing for fine-grained recognition." In Proceedings of the IEEE conference on computer vision and pattern recognition, pp. 580-587. 2013.
Fails, J.A. et al. "A design tool for camera-based interaction." In Proceedings of the SIGCHI conference on Human factors in computing systems, pp. 449-456. ACM, 2003.
Fails, J. A. et al. "Light widgets: interacting in every-day spaces." In Proceedings of the 7th international conference on Intelligent user interfaces, pp. 63-69. ACM, 2002.
Franklin, M. J. et al. "CrowdDB: answering queries with crowdsourcing." In Proceedings of the 2011 ACM SIGMOD International Conference on Management of data, pp. 61-72. ACM, 2011.
Hall, M. et al. "The WEKA data mining software: an update." ACM SIGKDD explorations newsletter 11, No. 1 (2009): 10-18.
Hall, M. A. "Correlation-based feature subset selection for machine learning." Thesis submitted in partial fulfillment of the requirements of the degree of Doctor of Philosophy at the University of Waikato (1998).
Hara, K. et al. "Tohme: detecting curb ramps in google street view using crowdsourcing, computer vision, and machine learning." In Proceedings of the 27th annual ACM symposium on User interface software and technology, pp. 189-204. ACM, 2014.
Hudson, S. E. et al. "Techniques for addressing fundamental privacy and disruption tradeoffs in awareness support systems." In Proceedings of the 1996 ACM conference on Computer supported cooperative work, pp. 248-257. ACM, 1996.
Kastrinaki, V. et al. "A survey of video processing techniques for traffic applications." Image and vision computing 21, No. 4 (2003): 359-381.
Khan, M. I. et al. "Comparison between different illumination independent change detection techniques." In Proceedings of the 2011 International Conference on Communication, Computing & Security, pp. 347-350. ACM, 2011.
Lasecki, W. S. et al. "Glance: Rapidly coding behavioral video with the crowd." In Proceedings of the 27th annual ACM symposium on User interface software and technology, pp. 551-562. ACM, 2014.
Lasecki, W. S. et al. "Real-time crowd labeling for deployable activity recognition." In Proceedings of the 2013 conference on Computer supported cooperative work, pp. 1203-1212. ACM, 2013.
Lee, M. L. et al."Sensor-based observations of daily living for aging in place." Personal and Ubiquitous Computing 19, No. 1 (2015): 27-43.
Marcus, A. et al. "Counting with the crowd." In Proceedings of the VLDB Endowment, vol. 6, No. 2, pp. 109-120. VLDB Endowment, 2012.
Maynes-Aminzade, D. et al. "Eyepatch: prototyping camera-based interaction through examples." In Proceedings of the 20th annual ACM symposium on User interface software and technology, pp. 33-42. ACM, 2007.
Salber, D. et al. "The context toolkit: aiding the development of context-enabled applications." In Proceedings of the SIGCHI conference on Human Factors in Computing Systems, pp. 434-441. ACM, 1999.
Tang, A. et al. "Exploring video streams using slit-tear visualizations." In CHI'09 Extended Abstracts on Human Factors in Computing Systems, pp. 3509-3510. ACM, 2009.
Von Ahn, L. et al. "Labeling images with a computer game." In Proceedings of the SIGCHI conference on Human factors in computing systems, pp. 319-326. ACM, 2004.
Vondrick, C. et al. "Efficiently scaling up crowdsourced video annotation." International Journal of Computer Vision 101, No. 1 (2013): 184-204.
Wah, Catherine. "Crowdsourcing and its applications in computer vision." University of California, San Diego (2006).
Zhao, W. et al. "Face recognition: A literature survey." ACM computing surveys (CSUR) 35, No. 4 (2003): 399-458.
Zimmer, T. et al. "AwareOffice: Integrating Modular Context-Aware Applications." In Distributed Computing Systems Workshops, 2006. ICDCS Workshops 2006. 26th IEEE International Conference on, pp. 59-59. IEEE, 2006.

* cited by examiner

Fig. 5   —201

Fig. 7A
Fig. 7B
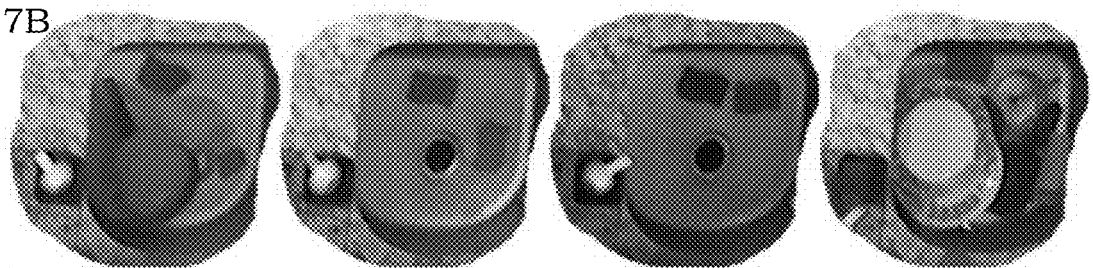
Fig. 7C
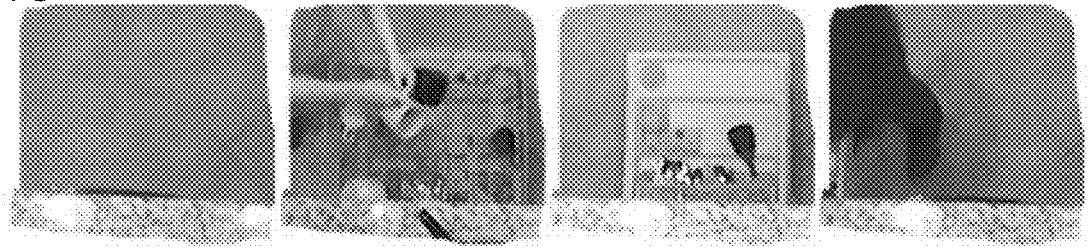
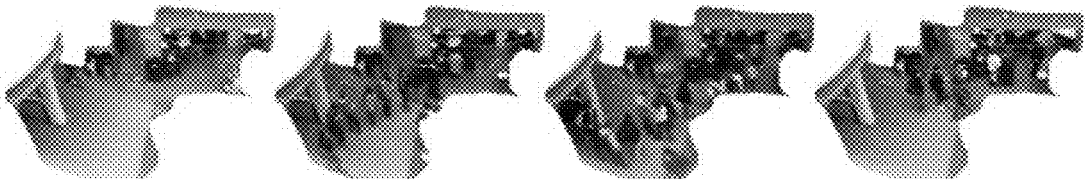
Fig. 7D

SYSTEM AND METHOD FOR ADAPTIVE, RAPIDLY DEPLOYABLE, HUMAN-INTELLIGENT SENSOR FEEDS

CROSS-REFERENCE TO RELATED APPLICATIONS

The present application is a 35 U.S.C. 371 US national phase application of PCT international application serial number PCT/US2016/024359, entitled "System and Method for Adaptive, Rapidly Deployable, Human-Intelligent Sensor Feeds" filed on Mar. 25, 2016, which claims priority to U.S. Provisional Application Ser. No. 62/177,825, filed on Mar. 25, 2015, all incorporated by reference herein in their entirety

STATEMENT REGARDING FEDERALLY SPONSORED RESEARCH

This invention was made with Government support under IIS1443760 awarded by the National Science Foundation. The Government has certain rights in this invention.

BACKGROUND OF THE INVENTION

This invention relates to adaptive sensors. More particularly, this invention relates to sensors capable of detecting a wide-range of conditions or events and deployable with minimal development because the sensor output is generated initially with the assistance of crowd workers until machine-learning aspects of the sensor system are able to provide accurate output.

For decades, "smart" environments have promised to improve our lives by inferring context, activity, and events in diverse environments, ranging from public spaces, offices, and labs, to homes and healthcare facilities. To achieve this vision, smart environments require sensors, and many of them. These systems are expensive because they require specific sensors to be placed throughout the environment. In addition, these systems are special purpose and often invasive (e.g., running power to several sensors).

An even more challenging problem is that sensor output rarely matches the types of questions humans wish to ask and expected of an intelligent environment. For example, a door opened/closed sensor may not answer the user's true question: "Are my children home from school?" Similarly, a restaurateur may want to know: "How many patrons need their beverages refilled?" and graduate students want to know "Is there free food in the kitchenette?"

Unfortunately, these sophisticated, multidimensional, and often contextual questions are not easily answered by the simple sensors deployed today. Although advances in sensing, computer vision (CV), and machine learning (ML) have improved sensing abilities, systems that generalize across these broad and dynamic contexts do not yet exist, while less adaptive systems are expensive and complicated. For example, some smart environments monitor instrumented space (scanners, RFID tags, etc.), making the system specific to a particular question to be answered and expensive due to the number of sensors and other equipment. It would therefore be advantageous to develop a sensor system that answers a broad range of user-defined questions based on real-time sensor feeds with reduced complexity and costs.

BRIEF SUMMARY OF THE INVENTION

According to one embodiment of the present invention is a sensor system that allows minimal and non-permanent sensor installation and is capable of generating human-centered and actionable sensor output, and a method of using the same. In one embodiment of the present invention, answers from crowd workers and machine-learning approaches are fused to provide instant, human-intelligent sensor systems, which end users can set up in minutes. This system can enable a variety of rich end-user applications and moves the field of human-computer interaction closer to responsive, intelligent environments. In one embodiment, the sensor system uses sporadic crowd assessment and machine learning to ensure continued sensor accuracy.

This sensor approach requires minimal and non-permanent sensor installation by utilizing any electronic device with sensing capabilities as a sensor host (such as camera on a cellular phone, for example). The sensor system is capable of answering diverse natural language "sensor" questions with reasonably high accuracy. In addition, the sensor system is easy enough to be used by non-experts, requiring zero training and providing live sensor output within seconds.

An example implementation includes an application programming interface (API) to enable access to sensor data streams. The API further provides a mobile application for easy, end-user authoring of on-demand sensor questions needed to create the intelligent sensors. The API also provides a tool for end-user programming of case-based events that turn sensor output into meaningful actions, such as providing an electronic alert.

BRIEF DESCRIPTION OF THE SEVERAL VIEWS OF THE DRAWINGS

FIGS. 7A-7D show a sensor image time series. Associated questions ask "Do you see a parked car?" (FIG. 7A), "How many dishes are in the sink?" (FIG. 7B), "Do you see a dishwasher door?" (FIG. 7C), and "How orderly is the line?" (FIG. 7D).

DETAILED DESCRIPTION OF THE INVENTION

Figure 1:
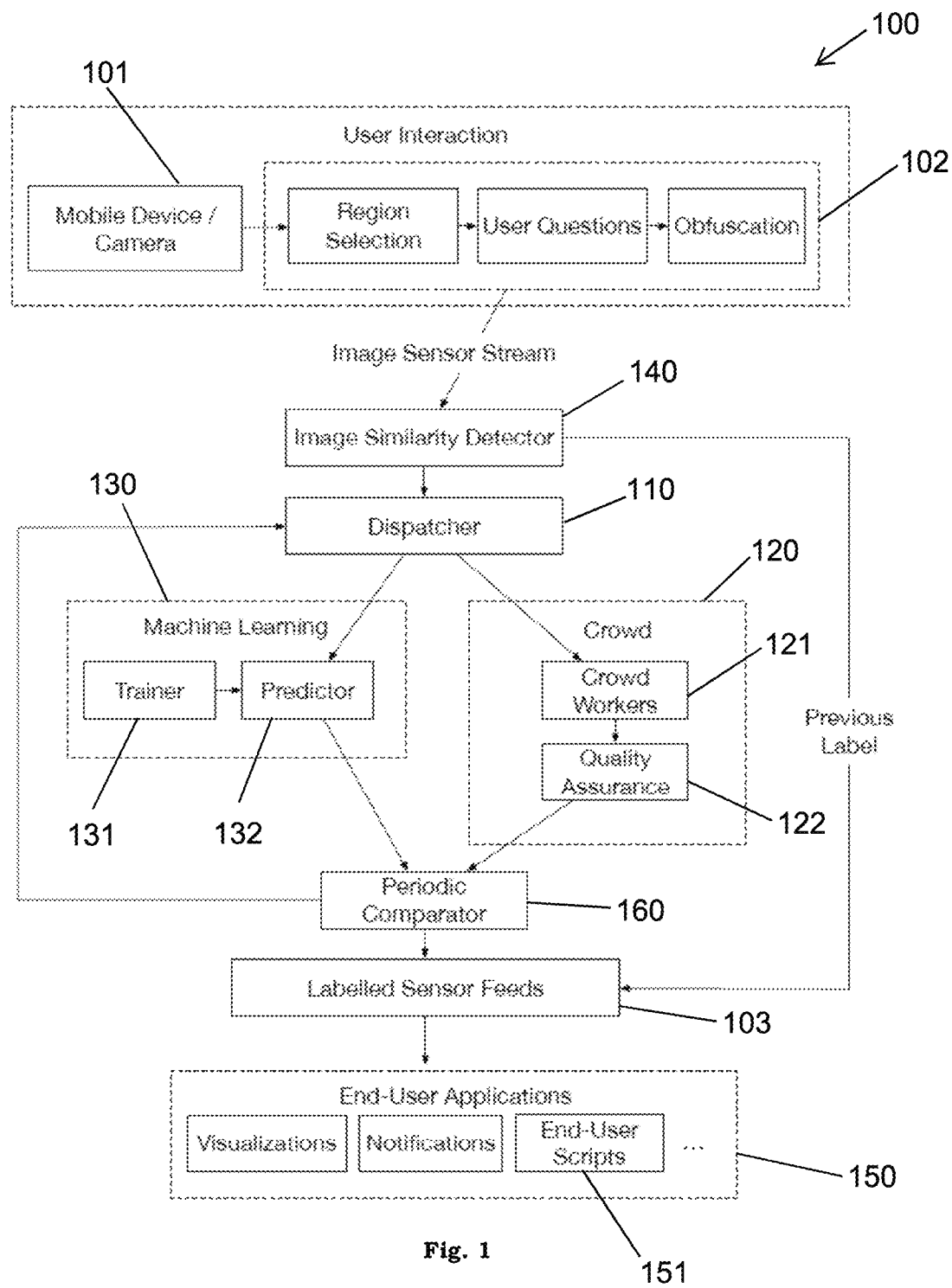
FIG. 1 is a block diagram of the sensor system architecture, according to one embodiment.

In accordance with one embodiment, FIG. 1 shows the architecture of a sensor system 100. In this embodiment, the system 100 comprises a sensor 101 that provides a sensor feed for further processing and analysis by different components of the system 100. In this particular embodiment, the sensor 101 comprises a mobile electronic device with a camera. Mobile electronic devices, such as cellular phones, are especially suited for use as a rapidly deployable sensor 101 because of their built-in computer, battery, and communication abilities. However, many other devices capable of providing sensor output can be used, such as tablets, security cameras, wi-fi cameras, and Kinects. The time-series data from these types of sensors 101 offer rich contextual information about an activity or environment far more than what basic sensors (e.g., proximity sensors) can provide.

The feed or data from the sensor 101, such as an image, is sent to the interaction module 102, which provides a software-based interface to allow a user develop an initial sensor configuration. More specifically, the user interaction module 102 provides a platform for the user to select a region of the image captured by the sensor 101 that is relevant to the question the user wants answered. The interaction module 102 further allows the user to define a question and select an obfuscation method, if desired. For example, if the user wants to know if there are available parking spots in front of his apartment, using the interface (such as a mobile application (App.), web portal, or other software-based interface) provided by the interaction module 102, he would select the area of image corresponding to the road immediately adjacent to his apartment. Next, the user would enter "Is there an available parking spot?"

Once the initial setup is completed, the sensor 101 begins sending a sensor feed (or image stream for a camera-based sensor 101) to an image similarity detector 140 and a dispatcher 110. (While FIG. 1 is discussed in terms of images captured by the sensor 101, alternate embodiments can utilize other types of data, such as audio, for example, depending on the type of sensor 101 used.) The image similarity detector 140, which will be discussed in further detail, determines if the latest sensor feed has changed from the previously analyzed sensor feed. If no changes are present, the prior sensor value is used. If there are changes, indicating that the environment being sensed by the sensor 101 has changed, the sensor feed is passed to a dispatcher 110. The dispatcher 110 determines if the data set, comprising the sensor feed and question, should be sent to a machine learning module 130 or a crowd module 120, or both. The action of the dispatcher 110 depends partially on the state of the system 100.

For example, when the sensor system 100 is first configured, the dispatcher 110 sends the data set to the crowd module 120. Here, the data set (i.e., the question and a subregion of the sensor image in this example embodiment) are sent to the crowd 121, or a network of distributed human workers that process the request through a web-based interface. Crowdsourcing allows the system 100 to access human intelligence through online marketplaces, such as Mechanical Turk for example. Alternatively, the crowd 121 could comprise the user of the sensor system 100, who would be tasked with answering her own question, possibly for several images, before ML techniques are used to analyze the data set.

To ensure the accuracy of the crowd 121, the crowd module 120 further comprises an optional quality assurance module 122, which determines a consensus answer generated by the crowd 121. In one embodiment, several answers are collected per image, then fused together using the quality assurance module 122 (e.g., voting) to determine the best response for a given instance. The quality assurance module 122 also can be used to reduce noise and reject malicious workers.

After several initial data sets are analyzed by the crowd module 120, subsequent data sets can be sent to the machine learning module 130 by the dispatcher 110. The machine learning module comprises a trainer 131 and a predictor 132. The trainer utilizes the images labeled by the crowd module 120 to develop a machine learning classifier, which is used by the predictor 132 to label images captured by the sensor 101.

The labeled sensor feeds 103, created by the crowd module 120 or the machine learning module 130, are ultimately sent to an end user interface 150. However, prior to being sent to the end user interface 150, the labeled sensor feeds 103 from both the crowd module 120 and machine learning module 130 are sent to a comparator 160 to evaluate whether the answer to a questions for a particular sensor feed generated by the machine learning module 130 is similar to the answer generated by the crowd module 120. If the machine learning module 130 is producing reasonably accurate output (assuming the crowd module 120 is providing superior output based on direct observation and human level intelligence), then the sensor system 100 will continue relying on the machine learning module 130. Conversely, if the accuracy of the answers falls below a threshold, the dispatcher 110 will be instructed to send the data set to the crowd module 120 again. Subsequent answers from the crowd module 120 can be used to provide further training for the machine learning module 120 in this situation.

The end user interface 150, comprising an App. in one embodiment, allows the end user to visualize the labeled sensor feeds 103, set notifications based on the labeled sensor feeds 103, and otherwise take action based on the data received from the upstream components of the sensor system 100. The interaction module 102 and end user interface 150 can be part of the same App. in some embodiments.

In an alternative embodiment, the interaction module 102 and end user interface 150 are a web-based interface that allows sensor management for multiple sensors 101. In this embodiment, users link one or more sensors 101 to a web account, where they can create, modify, and synchronize sensors 101 across all of their devices. The web-based user interface also makes it possible to create new sensors 101 remotely. For example, users can "stick" a sensor device 101 at an elevated vantage point (e.g., for viewing an entire parking lot), and then manage and create the sensor 101 without having to physically touch the device 101.

Additionally, the end user interface 150 allows users to design event-based notifications using data from one or more sensors 101 (e.g., "Send an email when the stove is ON and ZERO people are in the house."). These directives can be chained together as set of conjunctions ("and" clauses), or for alternative responses ("or" clauses). Multiple chains can be defined to represent different configurations. These disjunctions of conjunctions comprise a fully expressive set of logical terms. One implementation allows users to select from an email, text message, audio, or chat alert. For each alert type, users are able to define a custom message, which can also display the current value of the sensor by using a specially marked variable.

Figure 2:
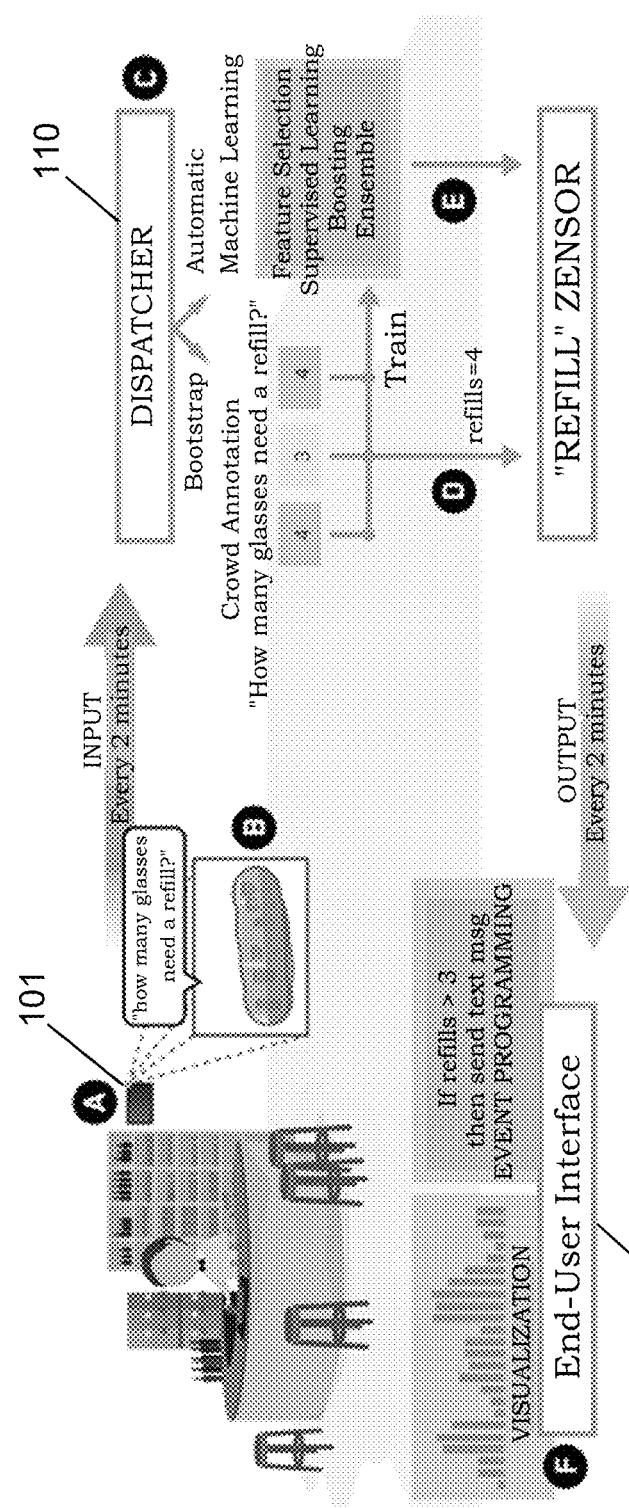
FIG. 2 presents an illustrated overview of the sensor system architecture.

FIG. 2 depicts an example implementation of the sensor system 100. The following description outlines how a user interacts with this example implementation. In the example system 100 shown in FIG. 2, a restaurant proprietor uses a smartphone (or tablet) and affixes it to the wall of his restaurant. He installs and launches an App. on the phone to load the interaction module 102. In this manner, a mobile application serves as the primary end-point for creating and modifying the sensor system 100. The phone uses the front facing camera as the sensor 101 to provide a live overview of the restaurant. On the App. provided by the interaction module 102, he presses the "New Sensor" button and circles the bar countertop, thus specifying a region of interest. He then enters a plain text question, for example: "How many drinks are almost empty?"

By pressing "Go", the sensor 101 is activated and starts providing real-time data. In other words, the device periodically takes snapshots of the region of interest and forwards the data to the dispatcher 110. He can now use the end user interface 150 (or App.) to see a real time visualization of how many drinks need to be refilled, or use an end user programming tool 151 to have the system automatically message a co-worker requesting help if the number exceeds a certain limit, as shown in the lower-left corner of FIG. 2. Within a few minutes, he could similarly set up sensors for: "Does table four need to be cleaned?", "Are customers wearing their coats inside?", "Is a check sitting on the table?" and other questions relevant to the dining experience.

Unbeknownst to the user, his sensor system 100 is initially powered by crowd workers 121 interpreting his plain text question, providing immediate human-level accuracy, as well as rich, human-centered abstractions. However, because using crowd workers 121 can be costly and difficult to scale, the crowd 121 is only used temporarily.

Seamlessly to the user, the answers from the crowd 121 are used to train and test image-based machine learning classifiers in the machine learning module 130. The machine learning module 130 tests against the ground truth provided by the crowd module 120, where the ground truth is information provided by direct observation (i.e. crowd workers 121) rather than by inference. If the machine learning module 130 begins to achieve human-like accuracies, the labeled sensor feeds 103 from the machine learning module 130 will be used alongside the feeds 103 provided by the crowd module 120.

Eventually, if sufficiently robust, the machine learning module 130 is used exclusively. This human-computer handoff is seamless and invisible to end users; as far as users are concerned, they have a sensor system 100 with human-level accuracy from initial set-up. Even if the machine learning module 130 does not achieve the needed level of accuracy, savings measures have been designed into the crowd-based method to conserve costs.

Because image data is being sent to the crowd 121, users may desire to obfuscate the image captured by the sensor 101 to preserve privacy. Utilizing the entire raw image can easily violate privacy, especially when personally identifying information is present, or when images depict people in sensitive situations. To mitigate this issue, the sensor system 100 asks users to select an arbitrarily shaped subregion relating to the question they wish to ask, where image data outside the subregion is masked away. The region may be arbitrarily shaped so only the region pertinent to the question is selected. In other words, the shape is not limited to a square or other predefined shape. By selecting a subregion, the system 100 reduces file size, removes unnecessary image elements, and simplifies the sensing effort for both human raters and ML techniques.

Figure 3:
FIG. 3 shows examples of image obfuscation methods employed by the system, including but not limited to (from top to bottom): raw image, light blurring, heavy blurring, and edge masking.

For users wishing to add an additional level of privacy, the system 100 employs several image obfuscation methods. Obfuscation is applied to images before they are sent to the crowd 121 by selecting an obfuscation method in the interaction module 102. Users can choose to leave the image subregion unaltered, or select from four obfuscation methods: light blur, heavy blur, median filter, and edge filter. Examples of obfuscated images are shown in FIG. 3. The level of obfuscation will depend on the level of privacy desired and the need for detail in the image to answer the question. For instance, in the drink example, a higher level of image detail would be required to determine if a drink refill is needed.

Questions define the "capabilities" of a sensor, and thus, the quality of answers depends on several factors, such as the question's context and relevance. To further add context and relevance, in one embodiment, the system 100 requires users to define a data type when creating new sensors. Data types curb variance and constrain the range of possible values returned by a sensor system 100 (i.e., the answer to the sensor's question), and facilitate simple automated processing of the data stream. To this end, the system 100 categorizes questions into four example data types:

Yes/No—This type of question can be answered by either a 'Yes' or 'No' response. It is analogous to an ON/OFF sensor mechanism. Examples include: "Is the door open or closed?", "Is there food in the kitchen?", or "Can you see a bus in this image?" Unlike ON/OFF sensor mechanisms, however, the Yes/No question may still require context to be fully understood.

Number—Number data types are intended for questions that require counting. Numbers are continuous and are bound between a minimum and maximum range. Examples include: "How many cars do you see in the parking lot? (min=0, max=30)", and "What percentage of the water tank is full? (min=0, max=100)"

Scale—Scale data types are analogous to Likert-scale questions. Answers belong to discrete values specified within an increasing/decreasing scale. For this data type, users are required to supply scale-value pairs. Examples include: "How messy is this table? (1=Clean, 2=Average, 3=Messy)", or "How happy does the person look? (1=Very Sad, 2=Sad, 3=Neutral, 4=Happy, 5=Very Happy)"

Multiple Choice—When creating multiple choice questions, users are required to specify the list of choices. Unlike scale data types, choice order is irrelevant. Examples include: "What type of food do you see? (None; Indian; Thai, Asian; Salad; Bagels; Other)" and "What are people doing? (Reading; Using computers; Eating; Other)".

Figure 4:
FIG. 4 presents the web API, according to one embodiment.

As part of the initial set-up when creating sensors, users can specify the frequency at which sensor 101 feeds are generated. Depending on the question, frequency readings can range from near real-time (e.g., every one or two seconds for questions like "Is the refrigerator door open? [Yes/No]"), to extended periods (e.g., once per day for questions like "What product is advertised on the billboard? [MultipleChoice])." Referring to FIG. 4, which is a screenshot of an interface provided by the interaction module 102 according to one embodiment, the frequency selection is shown in the third input box from the top.

As previously discussed, the sensor system 100 comprises an image similarity detector 140. Sensor image streams often have periods of little variation (e.g., buildings after closing hours, outdoor scenes at night). Thus, to avoid soliciting redundant and thus costly responses from the crowd 121 on highly similar images, the image similarity detector 140 collapses runs of similar images using a simple technique, in one embodiment, where the number of changed pixels between two images is analyzed.

Using this method, the detector 140 counts the number of pixels that have changed from the previous frame using the image's RGB values and compares the count against a predetermined pixel difference threshold. Additionally, if the number of changed pixels in an image exceeds a certain image area percentage threshold, the detector 140 considers the image to be different. While this simple technique is used in this example embodiment, more sophisticated approaches, such as those described by Khan, Acharya, and Vern (Comparison between different illumination independent change detection techniques; in Proc. ICCCS '11) could be used in alternative embodiments.

By way of further example of one embodiment of the image similarity detector 140, its optimal parameters were determined from a corpus of roughly 6000 time-stamped images taken from multiple sensor streams. Each image was manually labeled as to whether or not it was the same as the previous image, providing a ground truth set. The image similarity detector 140 was then run, seeded with all combinations of the following thresholds: i) 2% to 40% pixel difference threshold, in 2% increments, and ii) 0.1% to 5.0% image area percentage threshold, in 0.1% increments. This produced 130 result sets, which was compared to the ground truth using Jaccard's distance metric. By using a pixel difference and image area threshold of 10% and 1.0% respectively, a Jaccard distance of 0.64 is achieved. On average, this process removes roughly 40% of images—a significant saving.

Figure 5:
FIG. 5 shows an image and question presented to crowd workers.

Referring again to the figures, crowd workers 121 process unanswered instances through a web-based interface, as shown in FIG. 5. The interface can vary based on the question/response type. Each sensor instance is answered (i.e., labeled) by several different crowd workers and voting is used to determine the best response using the quality assurance module 122. For example, in one embodiment, three crowd workers 121 answer each sensor instance and if an answer is provided by two or three of the workers 121, then that answer is used. Greater or fewer workers can be used depending on the complexity of the question. If the question is relatively simple, the quality assurance module 122 can be omitted and only a single worker is used. The answers provided by the crowd workers 121 are stored in a database for further processing by the sensor system 100.

For the system 100 to work efficiently, the sensor system 100 presents workers 121 with a simple task that they can answer quickly. As such, one image is presented to each worker and a single response is collected. For example, see FIG. 5, which depicts one image and one question presented to the worker 121. If workers 121 are unable to answer an image-based question, they can mark it as an exception. For example, the representative interface shown in FIG. 5 includes an "I Can't Tell!" button 201, which informs the system 100 that there is something amiss with the sensor 201 itself (e.g., occlusion, insufficient lighting) or that the question was poorly defined. In addition, workers 121 are prompted to provide textual descriptions when exceptions occur. This approach provides actionable user feedback to help remedy the problem.

To recruit users fast enough to receive answers in real time, one embodiment of the system 100 uses LegionTools, a toolkit for quickly recruiting workers from Mechanical Turk using a web-based interface. It leverages a retainer model, which pre-recruits workers so they are ready to respond to a task within as little as two seconds. When sensors 101 are crowd-powered, this sets the lower-bound on the system latency. As such, answers to sensor questions can be provided in nearly real-time. In alternative embodiments, the crowd module 120 sources answers in a different manner, yet still relies on the crowd 121.

Because solutions using crowd-power alone can be costly and difficult to scale (i.e., more sensors 101 requires more people), as previously discussed, the sensor system 100 reduces its reliance on crowd workers 121 over time by using crowd-provided answers to train the machine learning module 130 comprising machine learning classifiers, which are fast and inexpensive. However, even after machine learning has taken over processing sensor feeds, crowd workers 121 are still needed to provide a periodic human-accuracy baseline to ensure high accuracy.

To initiate the machine learning module 130, the trainer 131 receives all prior input data produced by the crowd module 120, except a portion of the data will be used for evaluation rather than training purposes. In one training technique, histogram equalization is applied to each image to reduce the effect of lighting variances. Then, each input image is processed into a large number of global features. Additionally, each sensor image (which is itself a subregion of the larger original image) is broken into a grid of sub-images. In addition to a 1×1 grid (simply the image unchanged), the trainer 131 also uses 4×4, 7×7 and 10×10 grids, for example. Each of these variously-sized sub-images is then converted to a luminance image, and the mean, standard deviation and mean-squared error across the window are used as numerical features. This produces a total of 332 image features. Feature selection is used as a post-process to extract exemplar features for a given sensor feed. While this embodiment describes one such method, a person having skill in the art will understand that other machine learning techniques can be used.

The machine learning module 130 uses correlation-based feature selection to select features from the training set, coupled with a backtracking best-first attribute searcher. Both algorithms are implemented in the Weka machine learning toolkit, in one embodiment. Other machine learning frameworks can be used in alternative embodiments, based on similar techniques. The selection process typically chooses between 10 and 30 features. Notably, the feature set is typically different for different sensors/question environments. That is, there is little overlap in the selected feature set for different sensor implementations.

After the feature set is selected, the trainer 131 constructs classifiers. In one embodiment, a "pre-classifier" is first trained to distinguish between exceptions and non-exceptions, to ensure that the main classifier is not polluted by incorrect data. For continuous (numeric or scale) sensors, a support vector machine regression classifier is trained using the SMOReg algorithm, for example. For discrete sensors (yes/no, multiple choice), a one-versus-one multiclass quadratic-kernel SVM trained with the SMO algorithm is used. For simple binary sensors, a single SVM is trained. In one embodiment, the SVM is used as the basic classifier because of its ease of training and predictable behavior, though other classification approaches can be used as valid techniques. In an alternative embodiment, the sensor system 100 maintains a library of feature extractors and classification algorithms as part of the machine learning module 130 and selects those exhibiting the best performance for a given sensor 101 implementation.

As the training corpus grows from crowd labeled instances, the accuracy of the machine learning module 130 typically improves. Once the accuracy of the machine learning exceeds a predefined threshold, such as 95% in one embodiment, the sensor hands off classification tasks to the machine learning module 130. It is also possible to do a soft handoff, where the relative weighting between crowd module 120 and the machine learning module 130 shifts over time.

To ensure continued accuracy after the handoff to the machine learning module 130, the system 100 periodically submits small batches of fresh sensor feeds to the crowd 121 for labeling, which is done to benchmark the accuracy of the machine learning module 130. If accuracy is sufficiently robust, the machine learning module 130 continues to power the sensor system 100. However, if the accuracy has fallen below a threshold, the system 100 can revert to crowd-power. This serves two immediate purposes: 1) the sensor system 100 immediately regains human-intelligence level accuracy, and 2) the system 100 can incorporate new labels in its training for a future handoff to the machine learning module 130.

Figure 6:
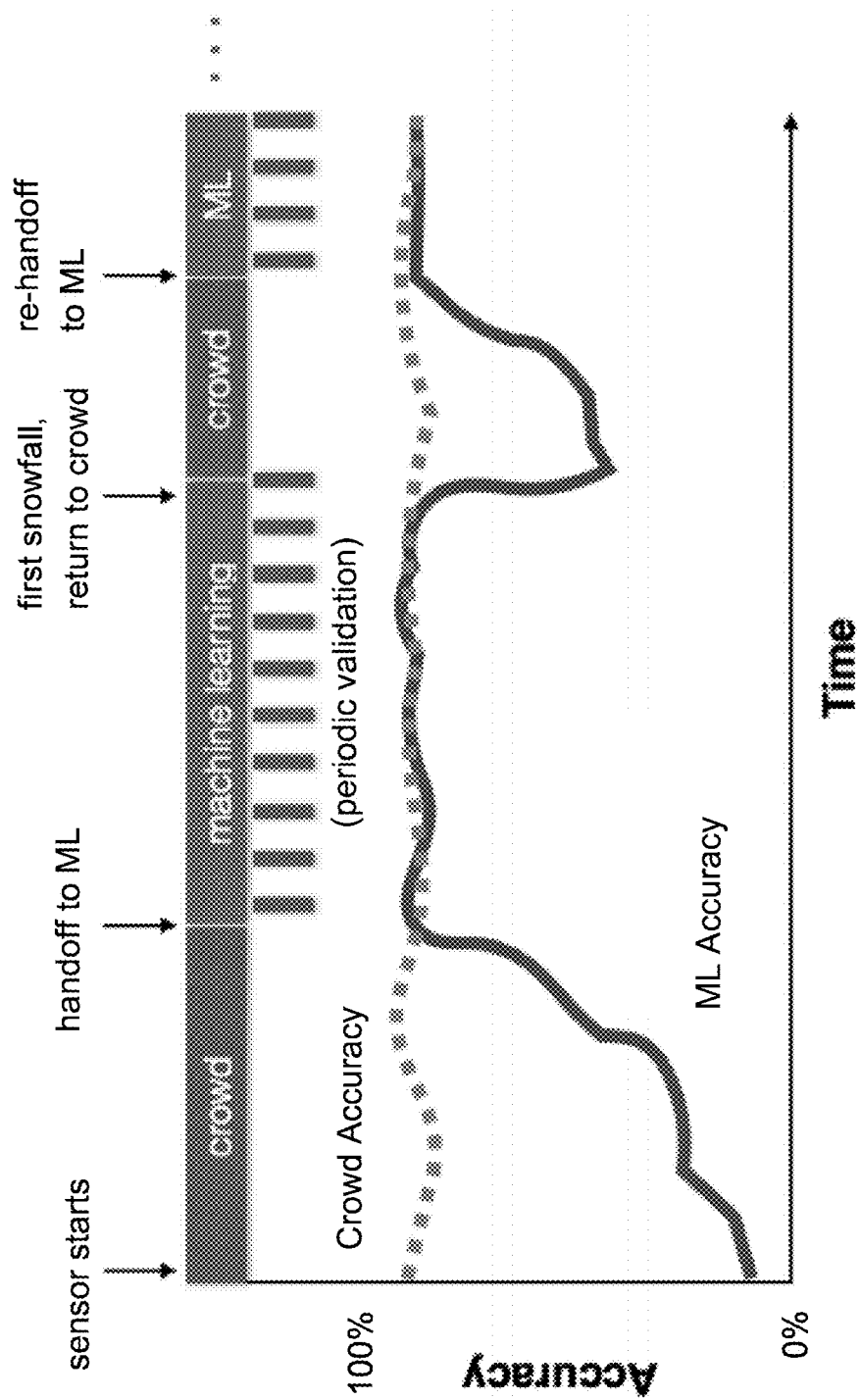
FIG. 6 shows a plot of the accuracy by the system over time, where the sensor system can toggle between the crowd and machine learning to adapt to environment changes.

FIG. 6 shows the relative accuracy for answers generated by the crowd module 120 and the machine learning module 130. As shown at the top of the graph in FIG. 6, the sensor system 100 initially relies on the crowd module 120 for a period of time until the machine learning module 130 reaches similar accuracy. Periodic validation of the machine learning module 130 is conducted by polling the crowd 121 at regular intervals. In this manner, the sensor system 100 automatically handles infrequent changes (such as the first snow fall in a parking lot) that would prove challenging for most computer vision-driven systems, which are trained before being deployed. Referring again to FIG. 6, this change is shown as a dip in the accuracy of the machine learning module 130, where the system reverts to the crowd module 120 prior to a re-handoff to machine learning module 130 when its accuracy improves. This ability to seamlessly toggle between crowd and automatic approaches, without sensor interruption, makes the sensor system 100 highly adaptive and robust.

In one example embodiment, the mobile application (or user interface provided by the interaction module 102) was developed on Android, and deployed on a fleet of low cost tablets; however, any smart device or operating system may be used. The user interface 102, backend server running the various modules, and end-user interface 150 were implemented using PHP, MySQL, jQuery, d3.js, node.js, and socket.io. The machine learning module 130 utilized the Weka toolkit. A web API that allows services and end-user applications to leverage sensor data can also be provided.

FIGS. 7A-7D show several examples of sensor feeds for various sensor systems 100. In this example, 16 sensors 101 were deployed across four diverse environments: a parking lot (FIG. 7A), a home kitchen (FIG. 7B), office kitchenette (FIG. 7C), and a building food court (FIG. 7D). Sensor questions ranged from "Do you see a parked car?" to "How many dishes are in the sink?" Moreover, a range of reporting frequencies (from once per minute to twice per hour) and deployment durations (10 days to 3 weeks) were represented in the example sensor systems 101 shown in FIGS. 7A-7D.

Figure 8A:
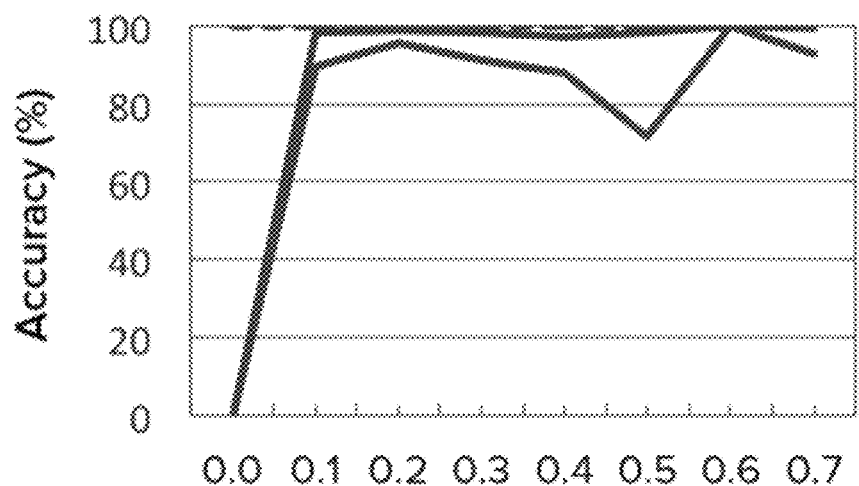
FIGS. 8A-8C illustrate 'live' accuracy evaluation of three sensors. This is the accuracy of a sensor over the course of its deployment, as viewed "live" by its operator. X-axes represent training set cutoff time t.
Figure 8B:
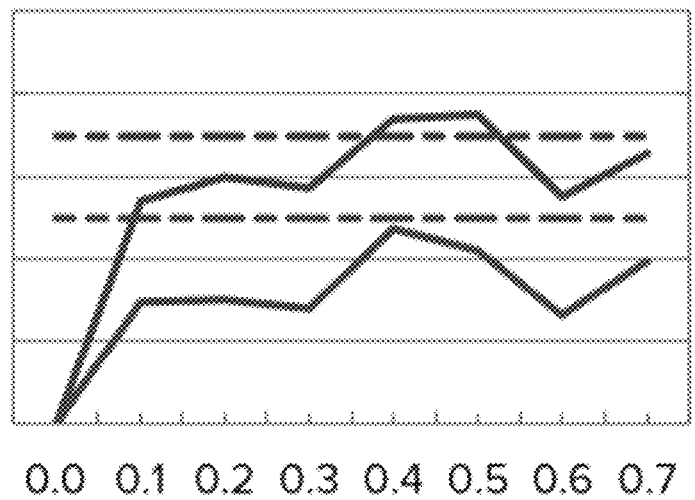
Figure 8C:
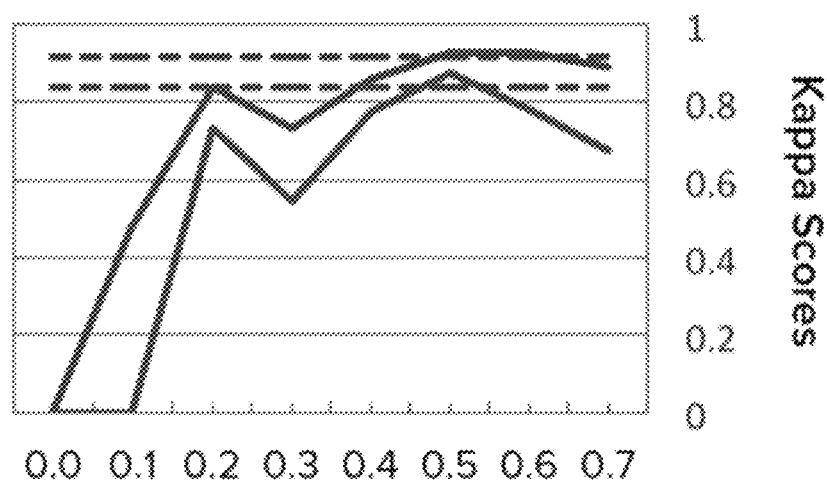

To analyze how well the sensors 101 can quickly provide accurate sensing data, the precision, recall, and latency of the aggregated crowd responses were measured for another set of sensor systems 100. FIGS. 8A-8C show the accuracy of crowd workers' ratings, using expert labels generated by the user—who had full understanding of the context of the question—as the ground truth. That is, FIGS. 8A-8C show the accuracy of a sensor system 100 over the course of its deployment as viewed 'live' by the user. FIG. 8A asked the question "Do you see a dishwasher door?"; FIG. 8B asked "How messy is the counter?; and FIG. 8C asked "Which parking spots are occupied?"

Cohen's kappa is calculated to mitigate the effects of skewed class distribution (e.g., a leftover food sensor 101 returned "no" over 75% of the time in another demonstration). Crowd accuracy reaches as high as 96.8% (kappa score 0.859), with mean accuracy 77.4% (median 76.0%). The crowd 121 performed very well on three sensor systems 100 (accessible parking spots occupied, number of cars in parking lot, and dishwasher door), moderately well on one sensor system 100 (leftover food), and poorly on three sensor systems 100 (food type, line length sensor, countertop messy).

The food type sensor system 100 required users to distinguish between seven types of cuisine ("I do not see any food", "Pizza", "Sandwiches", "Cake or pastries", "Asian or Indian", "Salad", "Bagels or doughnuts", "Other cuisine or I can't tell") based on a very low-resolution image, while the line length sensor and countertop sensors both involved subjective judgments (e.g. "Is the line orderly?" and "How messy is the countertop?"). These are subjective or open-ended questions. By contrast, quantitative questions ("Is there food here?", "Is the door closed?", and "How many cars are there?") generally had superior performance.

In designing questions to be posed to the crowd 121, operators may make assumptions that are not obvious to crowd workers 121, leading to incorrect results. In one example, workers 121 were asked to identify the presence of food on a kitchen countertop. The countertop has a permanent candy jar, which the user assumed would not be classified as food, yet several crowd workers 121 marked the otherwise empty countertop as having food. Based on the observed results, the question was amended to explicitly exclude candy, after which the expected results were obtained.

The demonstration sought to estimate the accuracy of a sensor system 100, over the course of its deployment, as viewed 'live' by the user. For each sensor, ten time periods each covering one-tenth of the data were defined, numbered t=0.1 through t=1.0. To estimate live accuracy at time t, all data up to time t was used for training, and then tested on all data from time t to time t+0.3 (i.e. it was tested on a sliding window of 30% of the data). The results for three representative sensor systems 100, as shown in FIGS. 8A-8C, are compared against the crowd accuracies. In many cases, a relatively small portion of the data is needed to reach crowd-level accuracies.

Figure 9A:
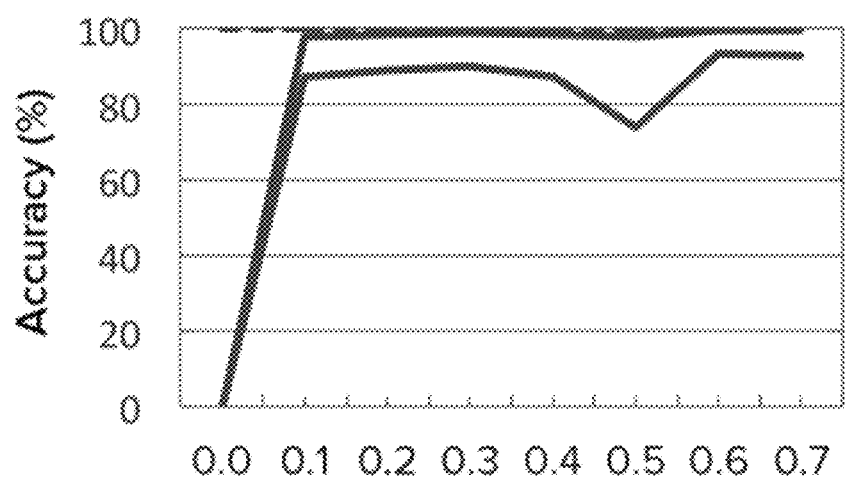
FIG. 9 illustrates "future" accuracy evaluation of three sensors. This is the accuracy of the sensor assuming ML handoff at time t. X-axes represent ML handoff time t.
Figure 9B:
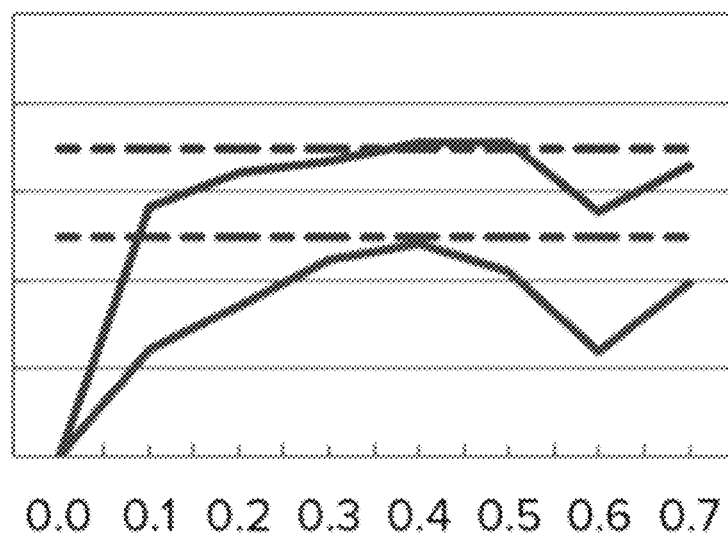
Figure 9C:
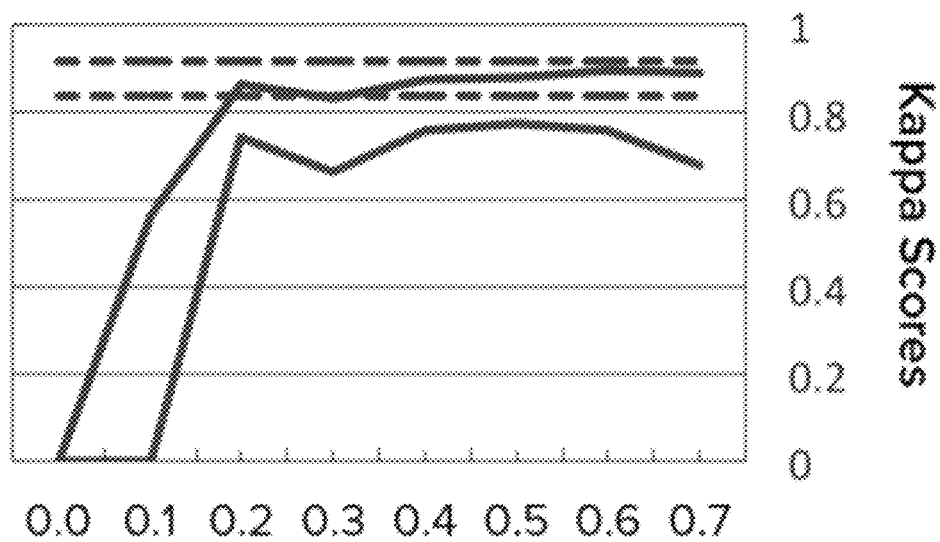

Alternatively, it is equally important to assess what the accuracy of a sensor system 100 would be going forward, assuming a ML handoff occurs at time t. To assess this, a complete ML handoff is simulated at each time increment. All data up to that point is used for training, while all future data is used for testing. This analysis is stopped when less than 30% of the data is available for testing, to avoid noisy results from insufficient test data. These results are summarized in FIGS. 9A-9C, compared against the overall crowd accuracies. The accuracies follow similar curves to the curves of FIGS. 8A-8C, suggesting that live classification accuracy may be able to predict future post-handoff classification accuracy.

For underperforming sensor systems 100, poor accuracy is often the result of questions that are subjective or required additional context. For example, one sensor asked, "How orderly is the line?" (FIG. 7D) with three possible answers: "No people visible in image", "People present, but no obvious organization", and "People standing in a line." Because the answer to whether a line is organized is subjective (e.g., relative to local cultural norms), crowd workers 121 will provide widely varying answers. Another sensor system 100 was tasked with sensing whether a dishwasher was opened or closed (see FIG. 7C). When the question was initially defined as "Is the dishwasher door open?", crowd workers 121 were confused, reducing sensor accuracy. In the image shown, no dishwasher was visible in the closed state due to the overhead view and obstruction by the countertop. When presented with the question of "Is the dishwasher door open?", the crowd 121 presumably wondered "What dishwasher?" Rephrasing the question to be more context-free—"Do you see a dishwasher door?"—significantly boosts accuracy.

There are a number of ways to alleviate "bad" sensor questions. In one embodiment, the system suggests example questions or provides structured question templates (e.g., "Do you see a _____ [in/on] the _____?"), helping end-users formulate questions with less ambiguity. These sample questions can be based on the accuracy of prior sensor system 100 implementations. Additionally, the "I can't tell" button 201 in the crowd interface could allow the system 100 to flag sensors 101 causing confusion and suggest the question or image subregion be modified. Another approach is for the crowd labeling interface to provide exemplar images, one for each possible answer (e.g., show examples of both dishwasher door states). In this approach, the user could take images of the door in both the open and closed states to provide the example images. Finally, the system 100 can show crowd workers 121 a random set of previously collected sensor images that hopefully better capture the full range of possible states (e.g., orderly line to chaotic), so they can make better relative judgments.

While the disclosure has been described in detail and with reference to specific embodiments thereof, it will be apparent to one skilled in the art that various changes and modification can be made therein without departing from the spirit and scope of the embodiments. Thus, it is intended that the present disclosure cover the modifications and variations of this disclosure provided they come within the scope of the appended claims and their equivalents.

What is claimed is:

1. An adaptive sensor system comprising:
a sensor, wherein the sensor provides a sensor feed of an environment;
a user interface,
wherein a user can enter a question to be answered by the sensor system using the user interface,
wherein the question relates to a condition of the environment;
a dispatcher, wherein the dispatcher directs the sensor feed and question to at least one of a crowd module and a machine learning module,
wherein at least one of the crowd module and the machine learning module generates a labeled sensor feed derived from the sensor feed,
wherein the labeled sensor feed comprises an answer to the question; and
a periodic comparator that evaluates a relative accuracy of the labeled sensor feed generated by the machine learning module as compared to the labeled sensor feed generated by the crowd module.

2. The adaptive sensor system of claim 1, wherein the dispatcher directs the sensor feed to the crowd module upon initiation of the sensor system and prior to the machine learning module reaching a threshold level of accuracy.

3. The adaptive sensor system of claim 2,
wherein the labeled sensor feeds generated by the crowd module are sent to the machine learning module,
wherein the machine learning module uses the labeled sensor feeds to train a classifier.

4. The adaptive sensor system of claim 3, wherein the dispatcher directs the sensor feed to the machine learning module when the machine learning module is operating above a threshold level of accuracy.

5. The adaptive sensor system of claim 1, wherein the crowd module sends the sensor feed and question to crowd workers to generate the labeled sensor feed.

6. The adaptive sensor system of claim 1, wherein the user interface provides a visualization of the labeled sensor feed.

7. The adaptive sensor system of claim 1, wherein the sensor comprises an electronic device having a camera.

8. The adaptive sensor system of claim 1, wherein the sensor feed comprises an image.

9. The adaptive sensor system of claim 1, wherein the question has a data type selected from the group consisting of: yes/no, number, scale, and multiple choice.

10. The adaptive sensor system of claim 1, further comprising:
an image similarity detector that receives the sensor feed, wherein the image similarity detector maintains a current sensor value if there is no change in the condition of the environment over a period of time.

11. A method of creating an adaptive sensor system, comprising:
providing a sensor that provides a sensor feed;
receiving from a user interface a question, wherein the question is capable of being
answered by observation of the sensor feed;
sending the sensor feed to a crowd,
wherein the crowd generates a labeled sensor feed based on the sensor feed;
using the crowd labeled sensor feed to train a machine learning module;
sending a subsequent sensor feed to the machine learning module to generate the labeled sensor feed when the machine learning module exceeds a threshold level of accuracy; and
sending the labeled sensor feed to a user via the user interface wherein the labeled sensor feed comprises an answer to the question.

12. The method of claim 11, further comprising:
periodically testing the labeled sensor feed generated by the machine learning module against the labeled sensor feed generated by the crowd to determine the relative accuracy of the machine learning module.

13. The method of claim 12, wherein the sensor feed is sent to the crowd if the machine learning module falls below the threshold level of accuracy.

14. The method of claim 11, further comprising:
choosing a region of interest in the sensor feed prior to sending the sensor feed to the crowd.

15. The method of claim 11, further comprising:
obfuscating the sensor feed.

16. The method of claim 11, further comprising:
rejecting a second sensor feed received subsequent to a first sensor feed if there is no difference between the first sensor feed and the second sensor feed.

17. The method of claim 16, wherein the second sensor feed is rejected if a pixel difference threshold does not exceed 10%.

18. The method of claim 16, wherein the second sensor feed is rejected if an image area percentage threshold does not exceed 1%.

19. The method of claim 11, wherein sending the sensor feed to a crowd to generate a labeled sensor feed further comprises:
sending an example sensor feed to the crowd.

* * * * *